May 18, 1965 J. T. BLAKISTONE ETAL 3,184,132

TAPE TRANSPORT

Filed Feb. 7, 1962 2 Sheets-Sheet 1

INVENTORS
JAMES T. BLAKISTONE
DONALD L. BURDORF
BY Richard F. Carr
ATTORNEY

TAPE TRANSPORT

Filed Feb. 7, 1962

2 Sheets-Sheet 2

INVENTORS
JAMES T. BLAKISTONE
DONALD L. BURDORF
BY Richard F. Carr
ATTORNEY

United States Patent Office 3,184,132

Patented May 18, 1965

3,184,132

TAPE TRANSPORT

James T. Blakistone, Los Angeles, and Donald L. Burdorf, Arcadia, Calif., assignors to Leach Corporation, Compton, Calif., a corporation of Delaware Filed Feb. 7, 1962, Ser. No. 171,670

12 Claims. (Cl. 226—181)

Figures 1, 3, 4:
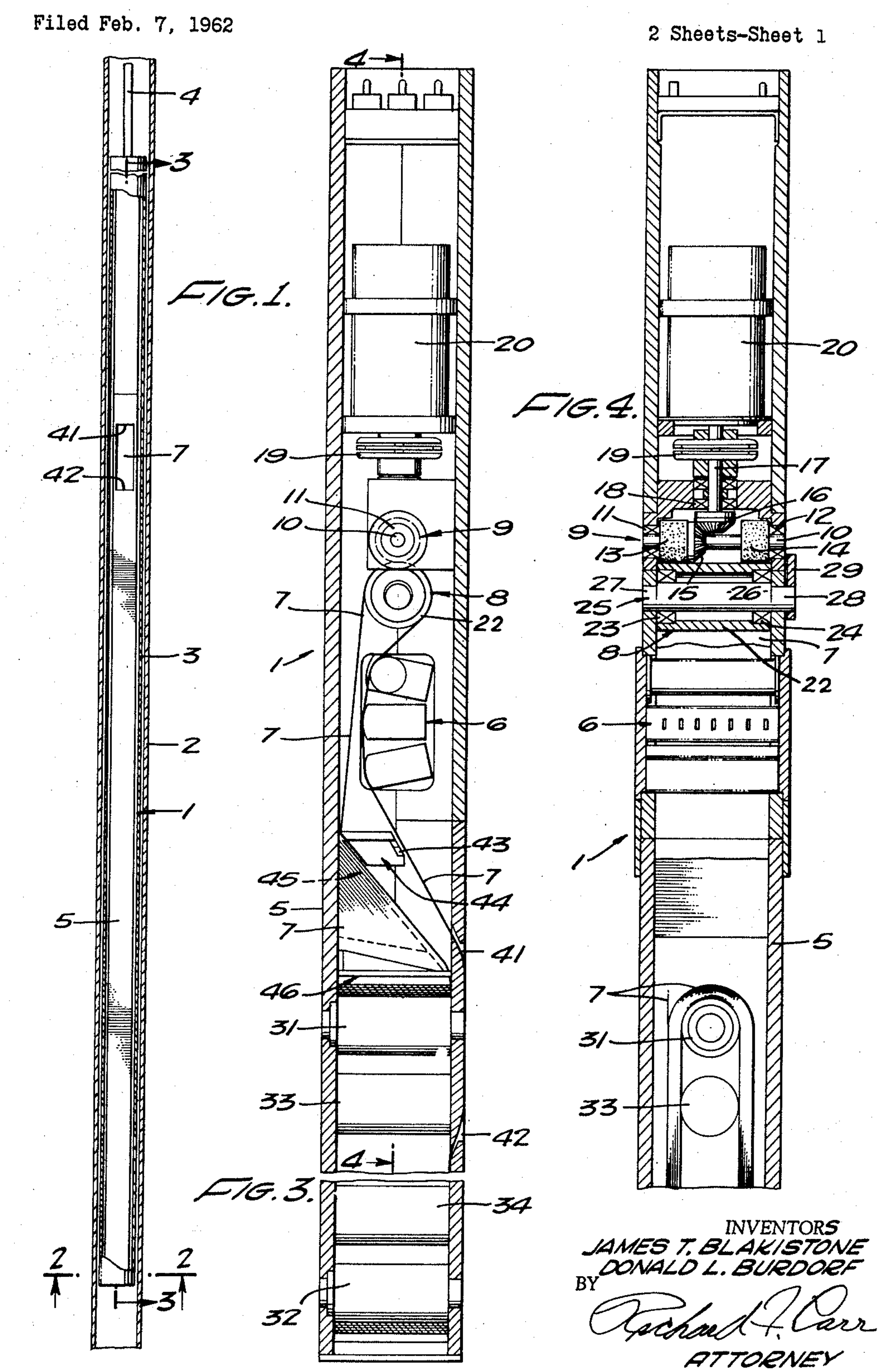

This invention pertains to an arrangement for a magnetic tape recorder, and in particular to such a device intended for use in areas of small lateral dimension.

One important application of this invention is in providing a magnetic tape recorder for down hole logging operations. Thus, the device of this invention is adapted to be lowered into a drilled well, such as an oil well, for recording desired information from the depths of the well. In order to accomplish this, obviously the device must possess a minimum of cross sectional dimensions in order that it will fit within a container that can be inserted into the relatively narrow confines of a well casing, and will not be in danger of becoming stuck fast within the well. In addition, in order to be of practical value, the device must hold a large quantity of magnetic recording tape in order that adequate information may be obtained and stored.

The device of this invention accomplishes these results through the provision of an elongated housing of considerable length but small cross sectional dimensions. Within the housing is an endless loop of magnetic recording tape held between two rollers and fed from the center portion of the wound tape to the reader head. In so doing the tape is rotated transversely through 90° and passed around the end of one of the rollers by being conducted for a short span along the exterior of the housing. The rotation of the tape occurs within a tubular element where the tape is rolled up transversely, permitting the tape to be turned in a space smaller than the width of the tape when the tape is flat. After the reader head, the tape passes around a pinch roller, driven by a capstan, is fed back beneath the tape at the reader head and then rotated back through 90° to its original angular position to enter the loop of the tape on the outside. A 90° rotation of the tape on both sides of the reader-capstan combination, one located between the combination and the tangent point of the tape with the inside of the loop formed by the rollers, and the other located between the combination and the tangent point of the tape with the outside of the loop formed by the rollers, is essential to one embodiment of the invention.

As a result of this construction, a maximum amount of magnetic recording tape may be held within a housing of extremely small lateral dimensions. In one embodiment of the invention, around five hundred feet of tape is held within a substantially square housing measuring only slightly more than one inch on a side. The housing for this embodiment is five feet in length, with the longitudinal dimension offering no penalty to a device intended for use within a well.

Therefore, it is an object of this invention to provide a tape transport of small lateral dimensions.

Another object of this invention is to provide a device for holding a continuous loop of tape in a housing approximating in lateral dimension the width of the tape.

Another object of this invention is to provide a tape transport in which an endless loop of tape is provided, but in which the possibility of wrinkles in the tape is minimized.

Yet another object of this invention is to provide an arrangement for utilizing an endless loop of magnetic recording tape in which the tape is fed from the central portion of the loop, rotated through 90°, passed under the reader head, and again rotated 90° to be returned to the exterior of the loop.

Figures 2, 5, 6, 7:
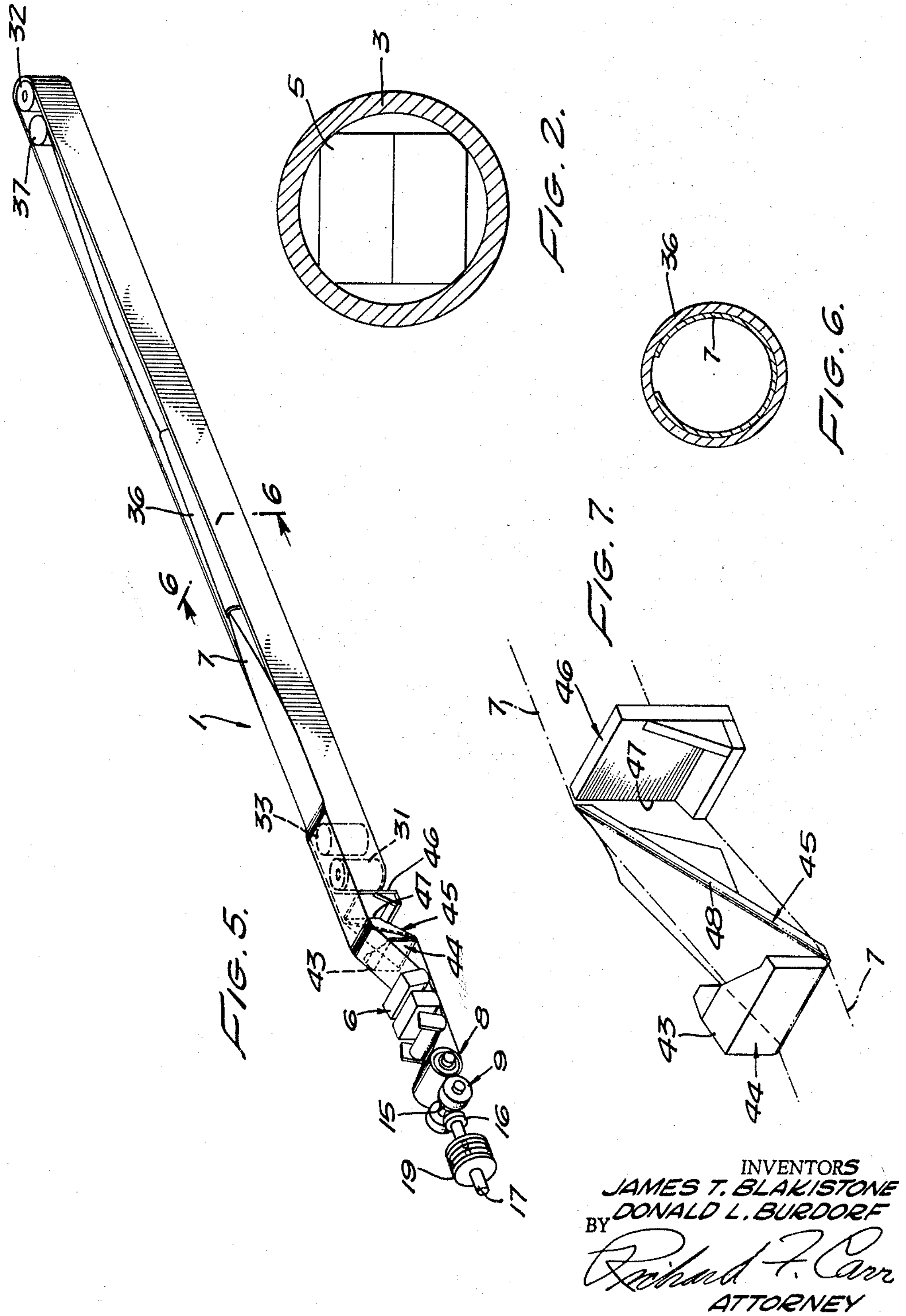

These and other objects will become apparent from the following detailed description taken in connection with the accompanying drawing in which:

FIG. 1 is a longitudinal sectional view of a well in which the device of this invention is suspended, FIG. 2 is an enlarged transverse sectional view showing the installation of the device of this invention within the outer protective tube, FIG. 3 is an enlarged longitudinal sectional view illustrating in particular the reader head and tape drive portions of the unit, FIG. 4 is a longitudinal sectional view taken along line 4—4 of FIG. 3, FIG. 5 is a perspective view of the magnetic recording tape and associated elements removed from the housing, FIG. 6 is an enlarged transverse sectional view of the tube that receives the inner turn of the tape prior to reaching the reader head, illustrating the manner in which the tape is rolled up transversely within the tube, and FIG. 7 is a fragmentary perspective view showing the guide means for rotating the tape 90° to its original rotational position prior to return to the outer turn of the loop of tape.

With reference to the drawing, the tape transport 1 of this invention may be seen in FIGS. 1 and 2 as utilized within a well casing 2. In this connection the unit 1 fits within a tube 3 of high strength nonmagnetic material such as Monel. Tube 3 may be relatively long, containing batteries, measuring instruments and other equipment, as well as the tape recorder of this invention. This assembly may be lowered into a producing oil well by a suitable cable 4 for measuring and recording desired information. For example, wall thicknesses of the well casing may be found in this manner, and areas of potential failure detected.

As best illustrated in FIGS. 3, 4 and 5, the device of this invention includes an elongated housing 5 which is substantially square with the corners rounded to permit it to fit in tube 3. The housing may be longitudinally split to permit access to its interior.

Within the housing there is disposed a reader head assembly 6 which typically may include from one to three reader heads. Magnetic recording tape 7, which is approximately as wide as the housing interior, passes beneath the reader heads and over a pinch roller 8 driven by capstan 9. The capstan is on a shaft 10 held within bearings 11 and 12, carried by the housing, and includes two rubber rollers portions 13 and 14. A bevel gear 15 is mounted on capstan shaft 10 intermediate the rollers 12 and 13, meshing with a second bevel gear 16. The latter gear is carried by shaft 17 rotatably supported in bearing 18 and connecting to coupling 19. The driveshaft of electric motor 20 also connects to the coupling so that upon rotation of the motor the capstan likewise is turned.

Unlike conventional designs, the driving force for the tape 7 comes from the capstan, which is of a high friction material, rather than from the pinch roller. As a result, it is not necessary to transmit the driving torque from a metal capstan to a rubber pinch roller, and thence to the magnetic tape as has been past practice. The advantage of the present design is that the capstan and pinch roller need be only the same width as the tape itself, thereby omitting the customary overlap of these elements and permitting a minimum transverse dimension to be maintained at the location of the capstan and pinch roller.

The pinch roller 8 is composed of a metal drum 22 rotatably mounted upon bearings 23 and 24 supported in turn on shaft 25. The shaft 25 includes a central portion 26 upon which the bearings 23 and 24 are mounted, and end segments 27 and 28 pivotally carried within openings in the wall of housing 1. The axis of the latter portions of the shaft 25 is displaced from the axis of the central portion 26 to provide the shaft 25 with an eccentric mounting in the housing. A lever 29 is fixed on end portion 28 of shaft 25 and serves as a means to rotate the shaft relative to the housing.

Therefore, when it is desired to place the pinch roller to the drive position, the lever 29 is pivoted to a position of longitudinal alignment with the housing, as seen in FIG. 3, shifting the drum 22 toward the capstan 9. When lever 29 is rotated upwardly 90° the central portion 26 of the shaft 25 moves away from the capstan and the drum likewise is moved sufficiently to release the driving force on the tape. The eccentric mounting of the shaft 25 for the pinch roller, therefore, provides a simple and effective means for engaging or releasing the drive force on the tape 7.

The tape is in the form of an endless loop, the major portion of which is wound over spaced rollers 31 and 32. These rollers are rotatably supported in the walls of the housing, with their axes extending transversely of the housing. Guide pins 33 and 34 are located adjacent the rollers 31 and 32 spaced a short distance inwardly thereof. The pins 33 and 34 serve to straighten possible loops that may form between the layers of the tape. In a typical example, there will be around seventy loops of the tape wound on the rollers 31 and 32.

The tape is fed to the reader head assembly from the center of the loop. Thus the center portion of the tape is removed and fed into an open tube 36 of smaller diameter than the width of the tape. This causes the tape to become rolled up transversely (as seen in FIG. 6), and the tape is rotated 90° about its longitudinal axis while it is within tube 36. This technique permits the tape to be turned through a 90° angle in the area between the opposed sections of the looped tape where there is insufficient clearance for the tape to be so turned while flat. In viewing the housing from the end containing the drive motor, the rotation given to the tape is in a counterclockwise direction.

The tape is then brought to the location of the roller 31 and pin 33 where it passes out of the housing through slot 41 and extends over the exterior of the housing to a slot 42 where it re-enters. The slot 41 serves as a guide in effecting the rotation of the tape in tube 36. The rotation of the tape, and extending it through the slots for a short run outside of the housing, permits the tape to pass the roller and pin at the end of the loop without sacrificing anything in overall width dimension for the unit. In addition, the length of tape on the exterior of the housing provides a visual check on the operation of the unit, whereby it can be determined immediately whether or not the tape is in movement. Any malfunctioning, therefore, can be determined before the device is inserted in tube 3 and placed into actual operation.

Upon re-entry of the housing the tape passes over the upper inclined surface 43 of guide member 44 to the reader head as described above. After the reader head assembly, and following engagement with the capstan, the tape is returned beneath the reader head area.

Following this, the tape is given another rotation of 90° about its longitudinal axis, returning it to its original angular position. This is accomplished first by passing the tape beneath the lower edge of guide member 44 which is raised above the bottom wall of the housing. The tape then moves up over guide member 45 which is in the form of an inclined plane extending upwardly from the base of guide 44 toward the top of upstanding guide block 46. The guide 45 is wedge-shaped, with edge 47 tapering toward vertical side 48 of the guide member 46. It is spaced from the edge 48, however, leaving a gap through which the tape passes.

Thus as the tape is directed up over the inclined plane 45 with its tapering side edge 48, it is rotated through 90° so that at edge 47 of the guide 46 it has been returned to its original rotational position. The guides 44, 45 and 46, therefore, cooperate to rotate the tape through 90° and return it to the rotational position of the major loop portion of the tape.

Upon leaving the guides 44, 45 and 46 the tape rejoins the principal portion wound around rollers 31 and 32. The tape is caused to enter the loop on the outside as its circuit is completed.

As a result of this construction, therefore, it is possible to accommodate a large quantity of tape in a unit of minimal transverse size. The overall dimensions of the substantially square housing are only slightly greater than the width dimensions of the tape itself. Thus this invention stores a large quantity of tape, feeds it beneath a reader head assembly, and returns the tape to a continuous loop in a unit of the smallest possible lateral dimensions. Relatively few guide members are required, with nearly all edge contact being made with the interior wall of the housing. This reduces friction and eliminates sharp edges. Furthermore, by having a short length of the tape on the exterior of the housing, the invention provides a visual check to determine the operability of the unit so that it will never be lowered into a well casing in an inoperative condition.

The foregoing detailed description is to be clearly understood as given by way of illustration and example only, the spirit and scope of this invention being limited solely by the appended claims.

What is claimed is:

1. A magnetic tape recorder comprising an elongated housing, guide members extending transversely of said housing, said guide members being spaced longitudinally of said housing, said guide members being adapted to receive an endless loop of magnetic recording tape wound on said spaced guide members so as to have an exterior and an inner portion, reader head means, tape drive means adjacent said reader head means, said reader head means and said tape drive means being located longitudinally of said housing beyond said spaced guide members, the inner portion of said endless loop of tape being adapted to extend to said reader head means and said tape drive means for return to the exterior of said loop of tape, means for rotating said inner portion of said tape 90° prior to reaching said reader head, and means for rotating said tape 90° following said tape drive means and prior to said return to said exterior of said loop.

2. A device as recited in claim 1 including in addition a second elongated housing receiving said first mentioned housing.

3. A device as recited in claim 1 in which said housing is provided with aperture means adjacent one of said guide members, said inner portion of said tape passing through said aperture means to the exterior of said housing, and including aperture means through which said tape passes in re-entering said housing adjacent said reader head means.

4. A device as recited in claim 1 in which said tape drive means includes a metal pinch roller, said tape extending around said pinch roller, and a capstan having an exterior surface of frictional material adjacent said pinch roller engaging the exterior of said tape around said pinch roller.

5. A device as recited in claim 4 including in addition eccentric mounting means for said pinch roller for providing said pinch roller with limited movement toward and away from said capstan.

6. A device as recited in claim 4 in which said capstan includes a duality of cylindrical portions, a shaft mounting said cylindrical portions in spaced relationship, a bevel gear on said shaft intermediate said cylindrical portions, said capstan drive means including a bevel gear engaging said first mentioned bevel gear, and motor means for driving said last mentioned bevel gear.

7. A tape recorder comprising an elongated housing, a duality of rollers spaced relatively far apart in said housing, said rollers being adapted to receive an endless loop of magnetic recording tape a portion of which is wound around said rollers, reader head means in said housing adjacent and beyond one of said rollers, tape drive means in said housing beyond said reader head means, said tape when so wound on said rollers having an inner turn, said inner turn of said tape extending from a location between said rollers over the axial end of the roller adjacent said reader head means to said reader head means in operative relationship therewith and to said tape drive means, and from said tape drive means to the exterior turn of said loop of tape, means for laterally bending said tape intermediate said rollers, means for rotating said tape 90° transversely relative to said portion of said tape which is wound on said rollers prior to passing over said adjacent roller, and means between said tape drive means and said outer turn of said loop of tape for rotating said tape 90° transversely to its original rotational position.

8. A device as recited in claim 7 in which said housing is provided with a duality of slots therein, one of said slots being located on the side of said adjacent roller which is adjacent said reader head means and tape drive means, and the other of said slots being on the opposite side of said adjacent roller, said tape extending through one of said slots to the exterior of said housing and through the other of said slots from the exterior of said housing to the interior thereof adjacent said reader head means.

9. A device as recited in claim 7 including in addition a duality of guide pins intermediate said rollers, one of said guide members being adjacent but spaced from either of said rollers.

10. A device as recited in claim 7 in which said last mentioned means for rotating said tape 90° includes in addition an inclined member intermediate said first and second members, said inclined member being inclined with respect to the longitudinal axis of said housing and extending from a position adjacent said lower edge of said first member to a position adjacent the upper end of said vertical edge of said second member, said inclined member being substantially wedge-shaped and tapering toward said vertical edge, said tape extending over said inclined member.

11. A device as recited in claim 7 in which said last mentioned means for rotating said tape 90° includes a first member relatively adjacent said tape drive means having a bottom edge substantially in the transverse plane of said tape at said tape drive means, said tape engaging said bottom edge, a second member spaced from said first member and remote from said tape drive means, said second member having an edge substantially at rights angles to said first mentioned plane and parallel to the axes of said rollers, said tape engaging said edge of said second member and being twisted 90° between said bottom edge and said vertical edge.

12. A tape recorder comprising an elongated housing, a duality of rollers in said housing having their axes parallel and extending transversely of said housing, an endless loop of magnetic recording tape the major portion of which is wound on said rollers, said tape having an inner turn, reader head means in said housing beyond said rollers, a length of said tape from the inner turn of said wound loop extending to said reader head means in operative relationship therewith, a first bending means for bending a portion of said tape adjacent said inner turn of said loop transversely with respect to said major portion of said tape, said tape being rotated 90° by said first bending means at said portion so bent, said housing having a duality of transverse slots in the wall thereof extending at right angles to the axes of said rollers and disposed one on either side of the roller adjacent said reader head means, with one of said slots being on the side of said roller adjacent said reader head means which side is adjacent said reader head means and the other of said slots being on the opposite side of said roller adjacent said reader head means, said tape passing through said slots whereby said tape passes said adjacent roller and is rotated 90° transversely by said first bending means, tape drive means in said housing engaging said tape, and means for rotating said tape 90° transversely beyond said reader head means for returning said length of tape to the exterior turn of said wound loop, said last mentioned means including a first guide surface in alignment with said slots, a second guide surface adjacent said rollers and in alignment with said axes of said rollers, and a third guide surface intermediate said first and second guide surfaces, said third guide surface tapering toward said second guide surface.

References Cited by the Examiner

UNITED STATES PATENTS

| | | | |
|---|---|---|---|
| 1,124,068 | 1/15 | Smitt | 346—33 |
| 1,825,142 | 9/31 | Bruno | 242—55.19 X |
| 2,323,215 | 6/43 | Gilman et al. | 242—55.19 X |
| 2,382,609 | 8/45 | Dale | 346—33 |
| 2,853,788 | 9/58 | Kinley | 346—33 |
| 2,922,642 | 1/60 | Cousino | 242—55.19 |
| 2,982,489 | 5/61 | Horres | 242—55.19 |
| 3,020,354 | 2/62 | McGowen | 179—100.2 |

FOREIGN PATENTS

| | | |
|---|---|---|
| 24,120 | 11/08 | Great Britain. |
| 269,445 | 11/29 | Italy. |
| 516,924 | 1/31 | Germany. |

ROBERT B. REEVES, *Acting Primary Examiner.*

DAVID L. MOSELEY, RAPHAEL M. LUPO, SAMUEL F. COLEMAN, *Examiners.*